No. 772,724. PATENTED OCT. 18, 1904.
G. LENTZ.
STONE GATHERING MACHINE.
APPLICATION FILED NOV. 25, 1903.
NO MODEL.
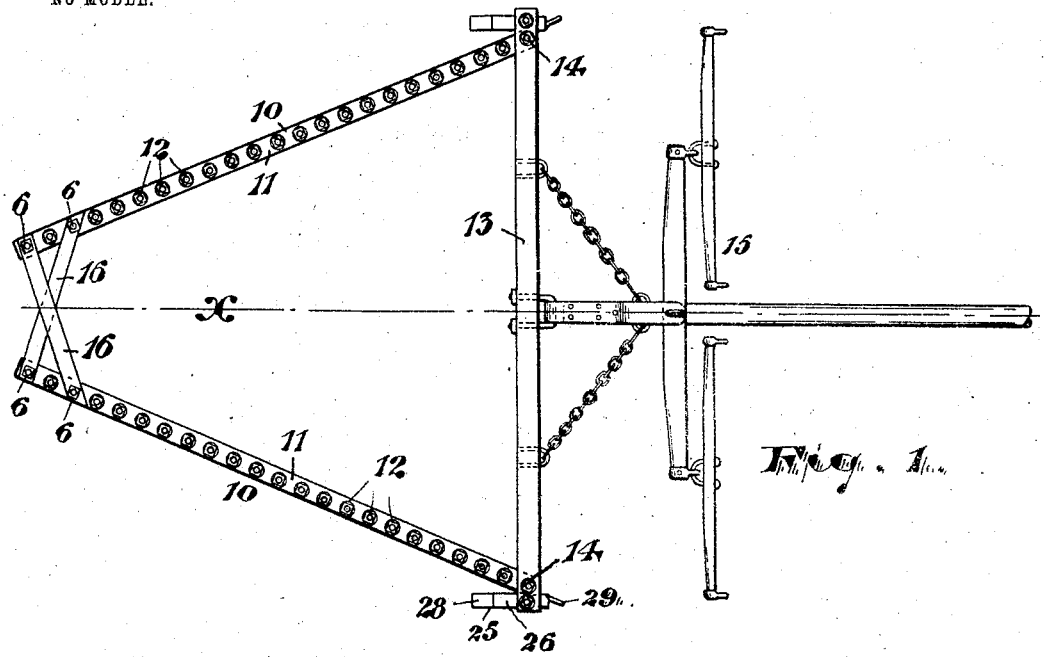
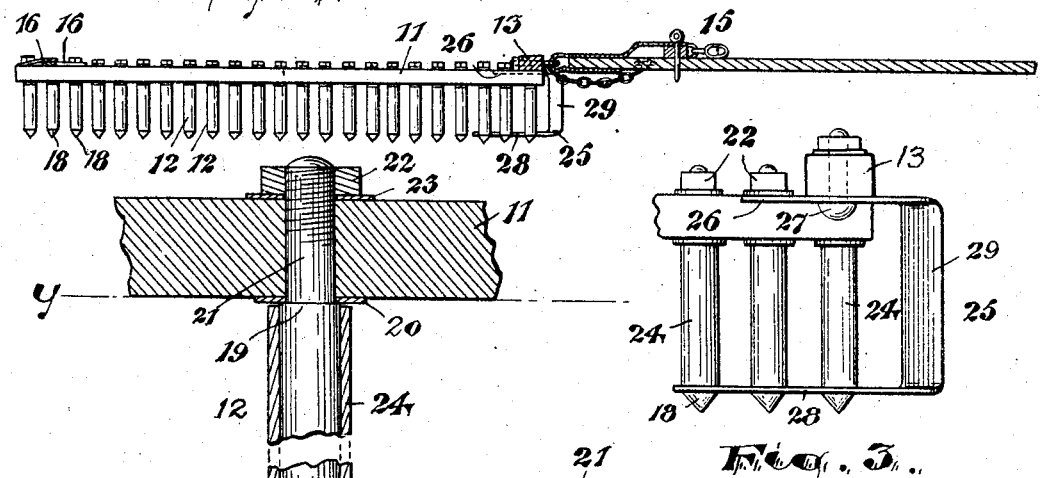
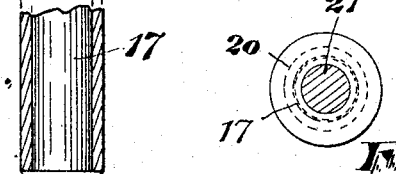
WITNESSES:
Ralph Lancaster
Russell M. Everett
INVENTOR
George Lentz
BY
Charles H. Pell
ATTORNEY No. 772,724. Patented October 18, 1904.

UNITED STATES PATENT OFFICE.

GEORGE LENTZ, OF NORTH ARLINGTON, NEW JERSEY.

STONE-GATHERING MACHINE.

SPECIFICATION forming part of Letters Patent No. 772,724, dated October 18, 1904.

Application filed November 25, 1903. Serial No. 182,580. (No model.)

*To all whom it may concern:*

Be it known that I, GEORGE LENTZ, a citizen of the United States, residing at North Arlington, in the county of Hudson and State of New Jersey, have invented and produced new and original Improvements in Stone-Gathering Machines; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.

The objects of this invention are to provide a farm implement for gathering stones which shall be simple, comparatively inexpensive to manufacture, and not liable to get out of order; to at the same time secure efficiency in rapidly and thoroughly gathering the stones; to prevent clogging of the machine by the stones; to secure a stone-gatherer which shall benefit the land by acting as a harrow, and to obtain other advantages and results, some of which may be hereinafter referred to in connection with the description of the working parts.

The invention consists in the improved stone-gathering device and in the arrangements and combinations of parts of the same, all substantially as will be hereinafter set forth and finally embraced in the clauses of the claim.

Referring to the accompanying drawings, in which like numerals of reference indicate corresponding parts in each of the several figures, Figure 1 is a plan of my improved stone-gatherer. Fig. 2 is a section of the same on line $x$, Fig. 1. Fig. 3 is a detail side elevation of a forward portion of the device. Fig. 4 is a vertical sectional view of a single tooth; and Fig. 5 is a transverse section upon line $y$, Fig. 4.

In said drawings, 10 10 indicate the side portions of my improved device, each comprising a horizontally-disposed beam 11, in which are arranged vertically-depending teeth 12, hereinafter described in detail. Said beams 11 are connected at their forward ends and held in relative position by a cross-piece 13, bolted to said ends, as at 14, and to which a team of horses may be attached by any suitable and well-known means 15, as shown. From said bar 13 the beams 11 converge rearwardly after the fashion of a letter V, although their rear extremities do not meet, but are held by cross pieces or braces 16, bolted to the beams 11, as at 6, at a suitable distance apart to form between themselves a windrow of stones. The said teeth 12, above referred to, each comprises a solid body portion or bolt 17, having at its lower end a conical head 18 and at a higher point an annular shoulder 19, to be seated against the under surface of the beam 11, a washer 20 being preferably placed between said shoulder and beam. The reduced shank 21 of said bolt, above the shoulder 19, projects through the beam 11 and is threaded to receive at its upper extremity a clamping-nut 22 and washer 23, by which the tooth can be firmly and rigidly mounted in the beam 11. Upon the body portion or bolt 17 of each tooth, between its conical head 18 and the beam 11, is a sleeve or piece of tubing 24, adapted to rotate freely and easily upon said bolt and forming the main exterior portion of the tooth to engage the soil and stones. Each beam has for its entire length a series of teeth like the one described, preferably stationed at a distance of about two inches apart, although the distance may be varied at pleasure in constructing machines.

The device thus constructed being placed upon the ground as plowed or prepared for planting is drawn along by the horses after the manner of a harrow, the teeth sinking to a depth of perhaps an inch and a half in the ground, and thus incidentally serving to pulverize the same. All stones coming between the open front ends of the sides 10 will be engaged by the teeth and gradually guided inward by virtue of the convergence of the said sides, the rotatable sleeves 24 of the teeth preventing any undue friction or clogging of the stones. Thus as the machine passes along the stones are left in a narrow windrow ready to be thrown into a cart, and, in fact, adapted to be much more easily handled than if piled into heaps.

To prevent the machine burying its forward end in the ground and throwing the rear end out, I provide upon the forward end of each side piece 10 a shoe 25, which comprises a piece of strap-iron having one arm bolted against the under side of the cross-beam 13 and a parallel arm 28 lying at about the level of the lower ends of the teeth outside the same and adapted to slide along the ground like a runner. The middle portion 29 of said U-shaped piece 25 is preferably twisted into alinement with the adjacent row of teeth, as shown in Fig. 1 more particularly, so as to aid in guiding stones within reach of the machine.

Having thus described the invention, what I claim as new is—

1. In a stone-gatherer, opposite side beams, teeth depending vertically from said side beams, and comprising each a fixed bolt and a sleeve rotatably mounted upon said bolt, and means for holding said side beams in relative position.

2. In a stone-gatherer, opposite side beams, each having a longitudinal series of depending teeth, each tooth comprising a fixed bolt having at its lower end a conical head and having between said head and the beam a loose sleeve, and means for holding said side pieces in relative position.

3. The combination with opposite side beams disposed in substantially the same plane and means for holding said beams in angular relation one to the other, of a longitudinal series of teeth depending from each side beam and having portions rotatably loose with respect thereto, and draft means.

4. The combination with the opposite side beams 10, of teeth arranged in longitudinal series on each beam, each tooth comprising a headed bolt having its end opposite said head reduced and threaded at its extremity to receive a clamping-nut, a sleeve mounted upon said bolt between its head and reduced portion, and means for holding said side beams in relative position.

5. The combination with a frame having a perforation therein, of a tooth comprising a bolt headed at one end and having its opposite end reduced to form a shoulder to engage said frame, the reduced portion being adapted to enter the said perforation and being threaded at its extremity to receive a nut, and a tubular sleeve upon said bolt between its ends.

6. In a stone-gatherer, the combination with opposite side pieces each having a longitudinal series of depending teeth, of a shoe applied to the forward end of each side piece and comprising two parallel arms one bolted to said side piece and the other lying in or near the plane of the points of said teeth, and having an intermediate portion in alinement with the said series of teeth.

In testimony that I claim the foregoing I have hereunto set my hand this 23d day of November, 1903.

GEORGE LENTZ.

Witnesses:
CHARLES H. PELL,
RUSSELL M. EVERETT.